United States Patent [19]
Carolan

[11] Patent Number: 5,241,517
[45] Date of Patent: Aug. 31, 1993

[54] INDEXING APPARATUS USING ULTRASONIC FEEDBACK

[75] Inventor: Kevin M. Carolan, Rochester, N.Y.

[73] Assignee: Xerox Corporation, Stamford, Conn.

[21] Appl. No.: 963,221

[22] Filed: Oct. 19, 1992

[51] Int. Cl.[5] .................. G03G 15/00; G01S 11/00
[52] U.S. Cl. .................................. 367/127; 335/324
[58] Field of Search ............... 367/96, 125, 127, 907; 355/324

[56] References Cited

U.S. PATENT DOCUMENTS

| | | | |
|---|---|---|---|
| 3,657,659 | 4/1972 | Johnson | 367/125 |
| 3,893,064 | 7/1975 | Nishihara et al. | 367/127 |
| 4,247,922 | 1/1981 | Jackson et al. | 367/6 |
| 4,506,354 | 3/1985 | Hansen | 367/101 |
| 4,578,674 | 3/1986 | Baker et al. | 340/710 |
| 4,713,665 | 12/1987 | Phelan | 342/104 |
| 4,752,917 | 6/1988 | Dechape | 367/125 |
| 5,097,453 | 3/1992 | Kobayashi et al. | 367/91 |

*Primary Examiner*—Daniel T. Pihulic
*Attorney, Agent, or Firm*—Duane C. Basch

[57] ABSTRACT

The present invention is a method and apparatus for monitoring the linear displacement of a body using a pair of ultrasonic transducers, one for transmitting an ultrasonic signal and one for receiving the ultrasonic signal. For example, the present invention may be used for monitoring the position of a stapling device relative to a set of copy sheets. The position monitoring system senses the linear position of the stapling device by measuring the time delay required for the ultrasonic signal to propagate from the transmitting transducer, located on a stationary reference, and the receiving transducer, operatively attached to the movable stapling device. The time delay is determined as a function of both a partial signal period and an integral number of complete signal periods for the ultrasonic signal. Moreover, because the frequency of the ultrasonic signal may exceed the resolution of a microcontroller used to monitor the position, frequency dividers are used to reduce the signal frequencies to measurable levels without impacting the performance of the position monitoring system.

13 Claims, 7 Drawing Sheets

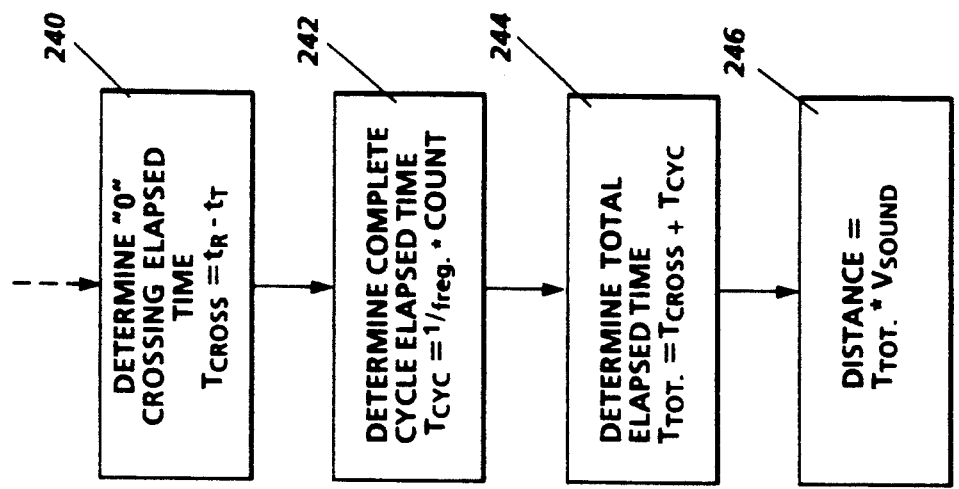
*FIG. 6C*
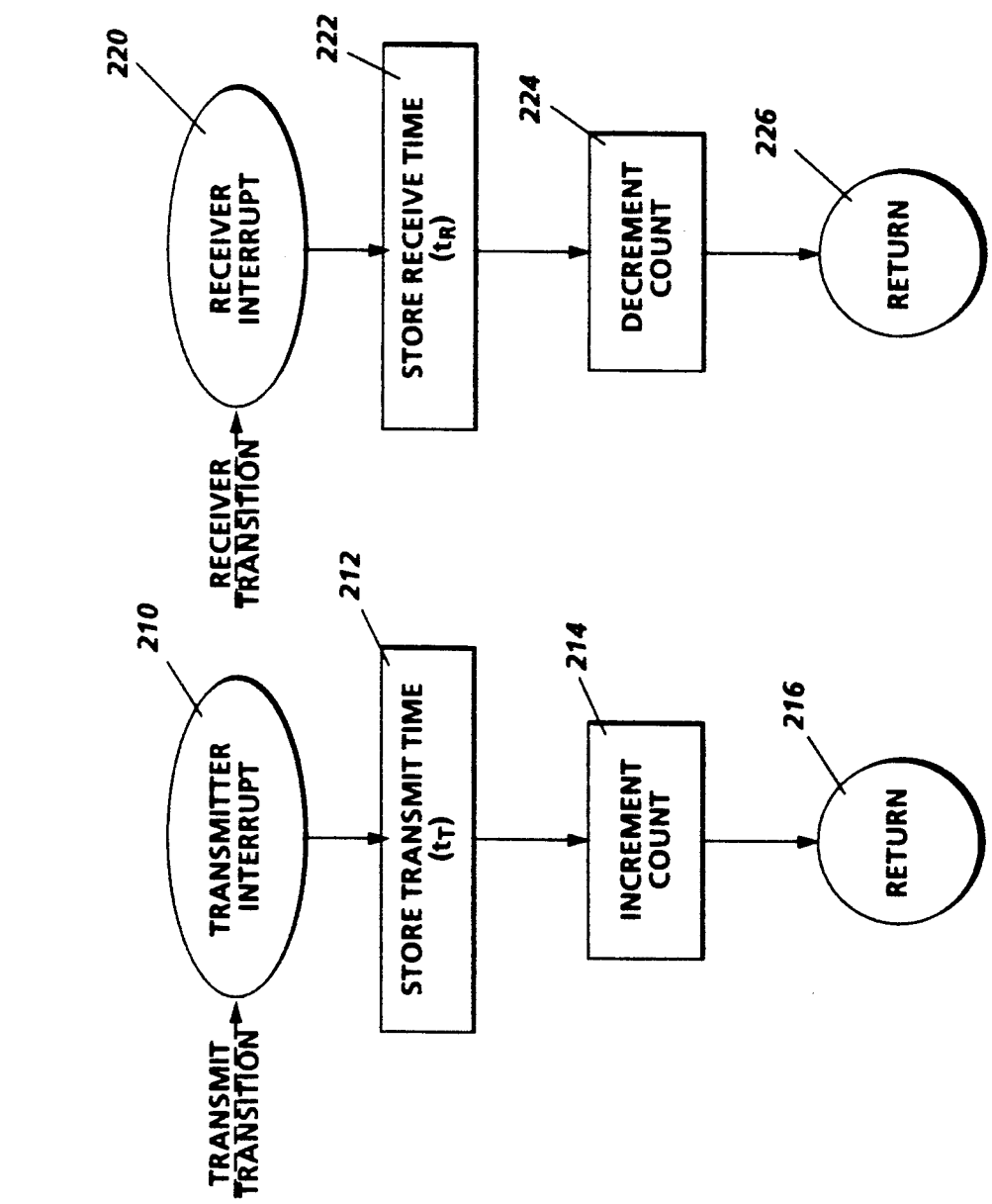
*FIG. 6B*
*FIG. 6A*

INDEXING APPARATUS USING ULTRASONIC FEEDBACK

This invention relates generally to an electrophotographic printing machine, and more particularly to an apparatus for determining the position of a stapling device relative to a set of copy sheets.

BACKGROUND AND SUMMARY OF THE INVENTION

In a typical electrophotographic printing process, a photoconductive member is charged to a substantially uniform potential so as to sensitize the surface thereof. The charged portion of the photoconductive member is exposed to a light image of an original document to selectively dissipate the charge thereon in the irradiated areas. This records an electrostatic latent image on the photoconductive member corresponding to the informational areas of the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet and heated to permanently affix the powder image to the copy sheet.

After each set of copy sheets is produced and collected at a finishing station, a stapler or stitcher is activated to attach the sheets of each set to one another. In this way, stapled sets of collated copy sheets are produced. Copy sheets may be printed as a landscape or portrait. In landscape printing, the page is printed so that when positioned for reading, the page is wider than it is long. In portrait printing, the page is printed so that when positioned for reading, the page is longer than it is wide. It is desirable that the stapling device used in the finishing station be capable of providing at least a portrait staple, i.e. a staple in the upper left hand corner of a set of copy sheets having a portrait orientation, a landscape staple, i.e. a staple in the lower left hand corner of a set of copy sheets having a landscape orientation, and a dual staple, i.e. a staple in the upper left hand corner and lower left hand corner of a set of copy sheets having a portrait orientation. In order to reliably control the position of the staple in the copy sheets, the location of the stapling device must be accurately determined before the staple is inserted.

Heretofore, various approaches have been devised for sensing the position of movable objects. The following disclosures may be relevant:

U.S. Pat. No. 5,097,453; Patentee: Kobayashi et al.; Issued: Mar. 17, 1992.

U.S. Pat. No. 4,713,665; Patentee: Phelan; Issued: Dec. 15, 1987.

U.S. Pat. No. 4,578,674; Patentee: Baker et al.; Issued: Mar. 25, 1986.

U.S. Pat. No. 4,506,354; Patentee: Hansen; Issued: Mar. 19, 1985.

U.S. Pat. No. 4,247,922; Patentee: Jackson et al.; Issued: Jan. 27, 1981.

U.S. Pat. No. 3,893,064; Patentee: Nishihara et al.; Issued: Jul. 1, 1975.

The relevant portions of the foregoing patents may be briefly summarized as follows:

U.S. Pat. No. 5,097,453 discloses an ultrasonic ground speedometer utilizing the Doppler effect to determine the speed of a moving object by transmitting an ultrasonic wave toward the ground over which the object moves, and receiving the reflected wave with a receiver. An arithmetic circuit is employed to determine the Doppler shift resulting from the relative motion between the moving object and the ground, and thereby the ground speed of the moving object. The frequency of the transmitted wave is varied so as to produce a constant reflected wave frequency to the receiver.

U.S. Pat. No. 4,713,665 teaches an ultrasonic ground speed and direction sensor having a vehicle mounted transmitter and receiver. A signal processor is used to superimpose an attenuated, phase-shifted transmit frequency on the output of the receiver to cancel out cross talk between the transmitter and receiver. The signal processor further includes a phase-locked loop circuit which generates an output voltage having amplitude and polarity corresponding to the speed and direction of the vehicle, respectively.

U.S. Pat. No. 4,578,674 discloses a method and apparatus for wireless cursor control. The apparatus comprises a control base and a wireless mouse. The mouse has an infrared detector to receive an infrared reference signal, from the control base, which in turn drives an ultrasonic transducer therein. The ultrasonic signal produced by the mouse transducer is received by a pair of ultrasonic detectors located on the control base. Knowing the separation distance of the ultrasonic detectors located on the control base, the initial position of the mouse can be approximated as a function of the time difference between an interruption of the infrared reference signal and the corresponding interruption of the ultrasonic signal received by the control base. Subsequently, relative motion of the mouse is determined by the magnitude of the Doppler effect change in frequency of the ultrasonic signals received by the ultrasonic detectors located on the control base.

U.S. Pat. No. 4,506,354 teaches a system suitable for detecting the position of an object over a flat rectangular area, for example, a CRT screen. A pair of ultrasonic transducers, spaced apart from one another, are individually pulsed at several frequencies and receiving means, one or both of the transducers, receive echoed pulses which are reflected by the object present on the surface. A discriminator elects desired echoes in accordance with a time delay, whereby the frequency, the magnitude of the signals, and the elected echoes are used to measure the distance of the object from the transducers and to determine its position.

U.S. Pat. No. 4,247,922 discloses a system for detecting the position of moving vehicles, for example, a lift truck. More specifically, the system is designed for use in a warehouse to verify that specific loads which are carried by the lift truck are deposited in the proper location. The vehicle transmits a first signal indicating that the load has been deposited. Subsequently, a central station transmits a beam which is detected by a receiver on the vehicle, causing the transmission of a second signal by the vehicle. The second signal is generated in response to the receipt of ultrasonic signals by transducers located on the left and right sides of the lift truck, whereby the frequency of the second signal is indicative of the direction that the lift truck is facing while depositing the load.

U.S. Pat. No. 3,893,064 describes a signal discriminating device comprising a band-pass filter for selectively passing signal- and noise-frequency components. Discrimination of signal from noise is accomplished based upon the existence of the two frequency components in such a manner that no signal is passed when both components are detected, while the signal-frequency component is passed when the noise-frequency component is not detected.

In accordance with the present invention, there is provided an apparatus for determining the distance between a movable body and a stationary reference location. The apparatus includes first transducer means, permanently affixed at the reference location, for emitting an ultrasonic energy wave in response to a first oscillating signal having a selected period, and second transducer means, affixed to the movable body, for generating a second oscillating signal, also having the selected period, in response to receipt of the ultrasonic energy wave produced by the first transducer means. The apparatus also includes synchronizing means, responsive to the first and second oscillating signals, for measuring an elapsed time of a partial ultrasonic energy wave period sent from the first transducer means and received by the second transducer means; means, responsive to the synchronizing means and a difference between the number of complete ultrasonic energy signal cycles sent by the first transducer means and received by the second transducer means, for determining the total elapsed time for propagation of the ultrasonic energy wave; and arithmetic means for determining the separation distance between the movable body and the reference location as a function of the total elapsed time.

In accordance with another aspect of the present invention, there is provided an apparatus for positioning a stapling device relative to a set of sheets. The apparatus includes means for moving the stapling device, in a linear direction substantially parallel to an edge of the set of sheets, to a selected stapling position, and ultrasonic means for sensing the linear position of the stapling device while being moved by the moving means.

In accordance with yet another aspect of the present invention, there is provided a method of monitoring the position of a sheet stapling device, with respect to a stationary reference position, in an apparatus having means for transporting the stapling device in a linear direction, substantially parallel to an edge of a set of sheets. The method comprises the steps of generating a first oscillating signal, said signal having a frequency in the ultrasonic range. Using a first transducer positioned at the stationary reference position to transmit an ultrasonic energy wave in response to the first oscillating signal. Receiving the ultrasonic energy wave with a second transducer, operatively associated with the stapling device, said second transducer producing a second oscillating signal in response to the ultrasonic energy wave. Finally, determining the position of the stapling device as a function of the time required for the ultrasonic energy wave to propagate from the first transducer to the second transducer.

BRIEF DESCRIPTION OF THE DRAWINGS

FIGS. 6A, 6B, and 6C are flowcharts illustrating the process steps executed by the microprocessor of FIG. 4.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 7:
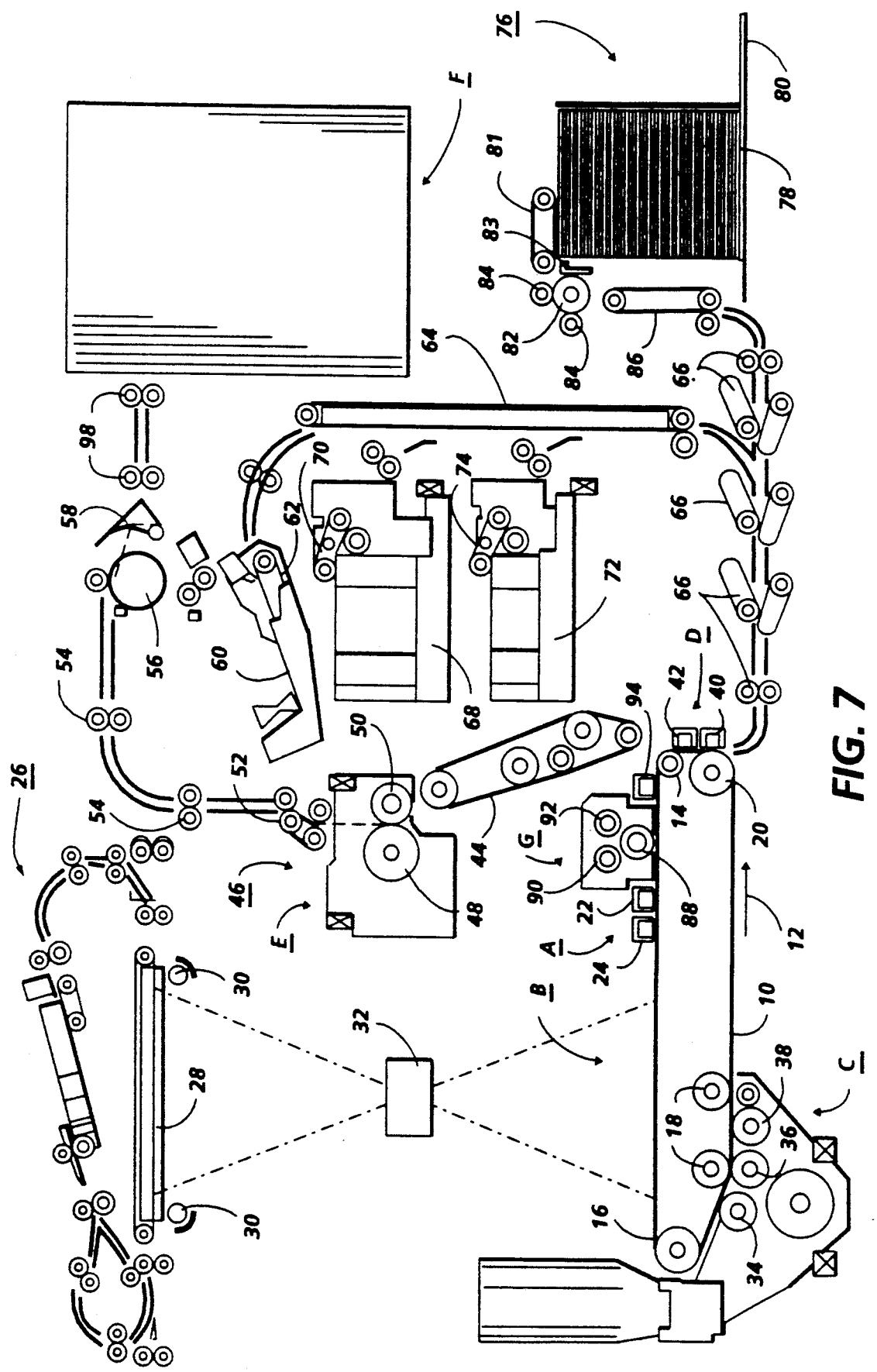
FIG. 7 is a schematic elevational view depicting an illustrative electrophotographic printing machine incorporating the finisher of FIG. 1 therein.

For a general understanding of the features of the present invention, reference is made to the drawings. In the drawings, like reference numerals have been used throughout to identify identical elements. FIG. 7 depicts, schematically, an electrophotographic printing machine incorporating the features of the present invention therein.

Referring to FIG. 7, the electrophotographic printing machine employs a photoconductive belt 10. Preferably, the photoconductive belt 10 is made from a photoconductive material coated on a ground layer, which, in turn, is coated on an anti-curl backing layer. The photoconductive belt is made from commonly known photoconductive materials, ground layers, and anti-curl backing layers. Belt 10 moves in the direction of arrow 12 to advance successive portions of the photoconductive surface sequentially through the various processing stations disposed about the path of movement thereof. Belt 10 is entrained about stripping roller 14, tensioning roller 16, idler rollers 18, and drive roller 20. Stripping roller 14 and idler rollers 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface of belt 10 passes through charging station A. At charging station A, two corona generating devices, indicated generally by the reference numerals 22 and 24, charge photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit, indicated generally by reference numeral 26, is positioned over platen 28 of the printing machine. Document handling unit 26 sequentially feeds original documents from a stack of documents placed by the operator face up in a normal forward collated order in the document stacking and holding tray. A document feeder located below the tray forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the top of the stack of original documents through the feed roll pair. A position gate is provided to divert the document to the inverter or to the feed roll pair.

Imaging of a document is achieved by lamps 30 which illuminate the document on platen 28. Light rays reflected from the document are transmitted through lens 32. Lens 32 focuses light images of the original document onto the charged portion of photoconductive belt 10 to selectively dissipate the charge thereon. This records an electrostatic latent image on the photoconductive belt which corresponds to the informational areas contained within the original document. In this way, a plurality of original documents may be sequentially exposed. Alternatively, document handling unit 26 may be pivoted away from platen 28 and an original document positioned manually thereon. In addition, one or more copies of the original document may be reproduced by the printing machine.

In an alternative embodiment, imaging station B may comprise an electronic scanning device, for example, a charge coupled device (CCD), which converts the light rays reflected from the surface of the original document into a plurality of electrical signals. Once scanned, the signals representing the original document may be stored in a suitable memory (not shown). Subsequently, the stored electrical signals may be used to modulate a raster output device such as a scanning laser or page-width array of light-emitting diodes, to achieve the selective dissipation of the charge on the surface of photoconductive belt 10. Thereafter, belt 10 advances the electrostatic latent image recorded thereon to development station C.

Development station C has three magnetic brush developer rolls, indicated generally by the reference numerals 34, 36 and 38. A paddle wheel picks up developer material and delivers it to the developer rolls. When developer material reaches rolls 34 and 36, it is magnetically split between the rolls. Photoconductive belt 10 is partially wrapped about rolls 34 and 36 to form extended development zones. Developer roll 38 is a cleanup roll. A magnetic roll, positioned after developer roll 38, in the direction of arrow 12, is a carrier granule removal device adapted to remove any carrier granules adhering to belt 10. Thus, rolls 34 and 36 advance developer material into contact with the electrostatic latent image, where the latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pre-transfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detach the copy sheet from belt 10. Conveyor 44 advances the copy sheets to fusing station E.

Fusing station E includes a fuser assembly, indicated generally by reference numeral 46, which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F or to duplex tray 60. At finishing station F, copy sheets are stacked in compiler trays to form sets of copy sheets. The sheets of each set are stapled to one another. The sets of copy sheets are delivered to a stacker. In the stacker, each set of copy sheets is offset from an adjacent set of copy sheets. Further details of finishing station F will be described hereinafter with reference to FIG. 1.

With continued reference to FIG. 7, when duplex solenoid gate 58 diverts the sheet into duplex tray 60. Duplex tray 60 provides an intermediate or buffer storage for those sheets that have been printed on one side and on which an image will be subsequently printed on the second, opposed side thereof, i.e. the sheets being duplexed. The sheets are stacked in duplex tray 60 face down on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are also fed to transfer station D from the secondary trays 68 and 72, both of which have elevators driven by a bidirectional AC motor. When the trays are in the down position, stacks of copy sheets are loaded thereon or unloaded therefrom. In the up position, successive copy sheets may be fed therefrom by sheet feeders 70 and 74, respectively. Sheet feeders 70 and 74 are friction retard feeders utilizing feed belts and trade-away rolls to advance successive copy sheets to transport 64 which advances the sheets to rolls 66 and then to transfer station D.

Trays 68 and 72 are secondary sources of copy sheets. A high capacity feeder, indicated generally by the reference numeral 76, is the primary source of copy sheets. High capacity feeder 76 includes a tray 78 supported on an elevator 80. The elevator is driven by a bidirectional AC motor to move the tray up or down. In the up position, the copy sheets are advanced from the tray to transfer station D. A fluffer and air knife 83 direct air onto the stack of copy sheets on tray 78 to separate the uppermost sheet from the stack of copy sheets. A vacuum pulls the uppermost sheet against feed belt 81. Feed belt 81 feeds successive uppermost sheets from the stack to an take-away drive roll 82 and idler rolls 84. The drive roll and idler rolls guide the sheet onto transport 86. Transport 86 advances the sheet to rolls 66 which, in turn, move the sheet to transfer station station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls 90 and 92, i.e. waste and reclaim de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles The toner particles on the reclaim roll are scraped off and deposited in a reclaim auger (not shown), where it is transported out of the rear of cleaning station G.

The various machine functions are regulated by a controller. The controller is preferably one or more programmable microprocessors or microcontrollers in communication with one another. The controller regulates all of the machine functions hereinbefore described. The controller further provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the documents and the copy sheets. In addition, the controller regulates the various positions of the gates depending upon the mode of operation selected.

Figure 1:
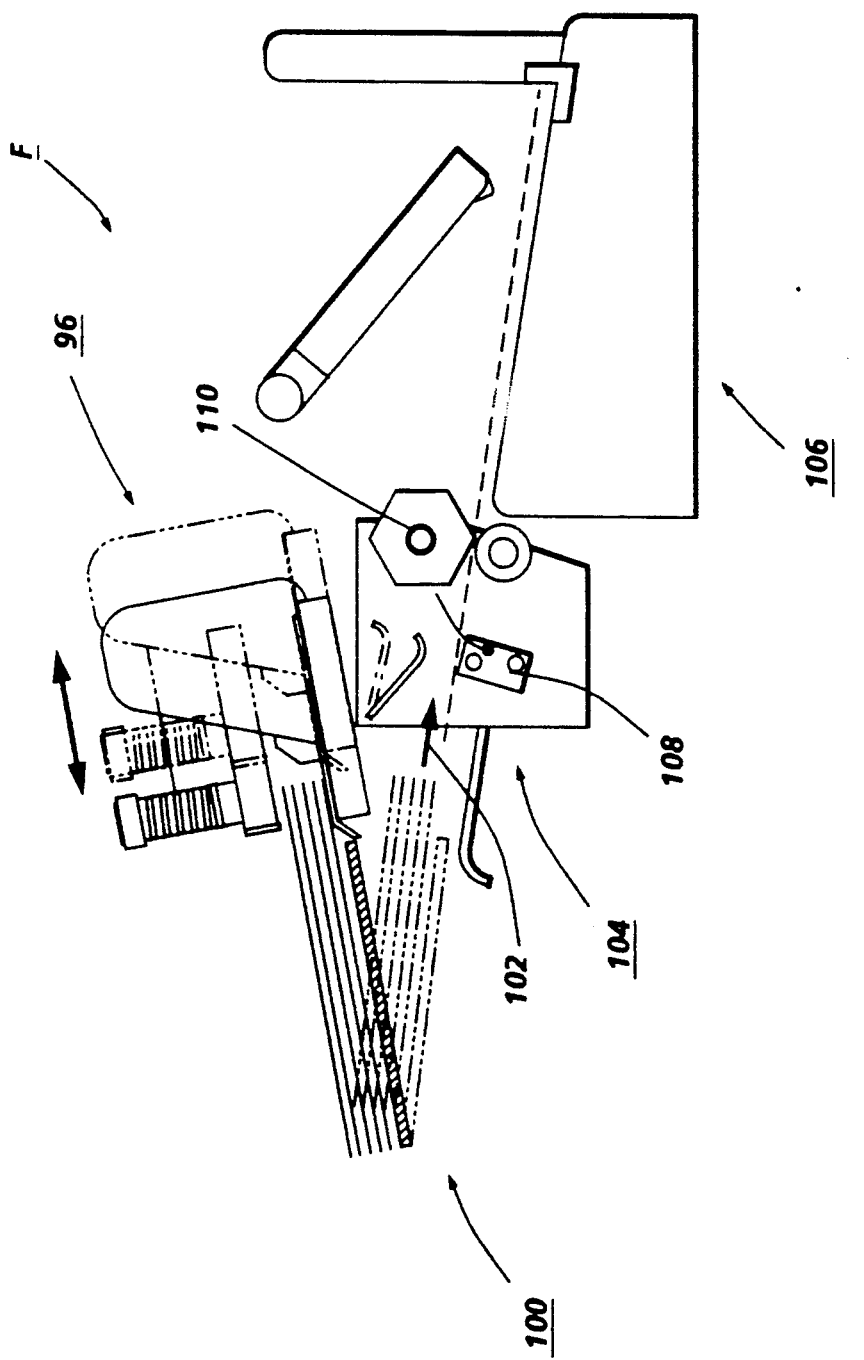
FIG. 1 is a schematic elevational view showing a finishing station of an illustrative printing machine incorporating the present invention therein.

Referring now to FIG. 1, the general operation of a finishing station, F, as commonly found within an electrophotographic printing machine, will be described. Further details of the operation of the stapler within finishing station F can be found in U.S. Pat. No. 5,029,831 by Green (issued Jul. 9, 1991), the relevant portions of which are hereby incorporated by reference. Finishing station F receives fused copies from the printing machine, rolls 98 (FIG. 7), and advances them in the direction of arrow 102 to the comelier tray, indicated generally by the reference numeral 100. Compiler tray 100 has two positions, an upper position and a lower position. When the staple option is selected, the compiler tray moves to the upper position in order to compile the sets of copy sheets. After the set of copy sheets has been compiled on tray 100, a stapler, indicated generally by the reference numeral 96 moves from a non-operative position to an operative position adjacent an edge of the set of copy sheets. Once the sets of copy sheets are stapled, the stapler moves from the operative position back to the non-operative position and the compiler tray pivots to an eject position. The stapled set of copy sheets is then ejected and the compiler tray raises to the upper position ready to compile the next set of copy sheets for stapling. After stapling, the set of copy sheets is ejected into the output transport assembly, indicated generally by the reference numeral 104, which drives the set of copy sheets out of compiler tray 100 into a stacker, indicated generally by the reference numeral 106. Output switch 108 senses each set of copy sheets as it leaves compiler tray 100. Output switch 108 informs the controller if a jam occurs. If a jam does occur, the controller then declares a fault code. Sets of copy sheets can range in thickness from about two sheets to one hundred sheets. Because of the wide range of sheet sizes and the varying thicknesses of the sets of copy sheets, hexagonal shaped foam rolls 110 are used to provide a uniform nip force to drive the stacks of copy sheets to stacker 106.

Figure 2:
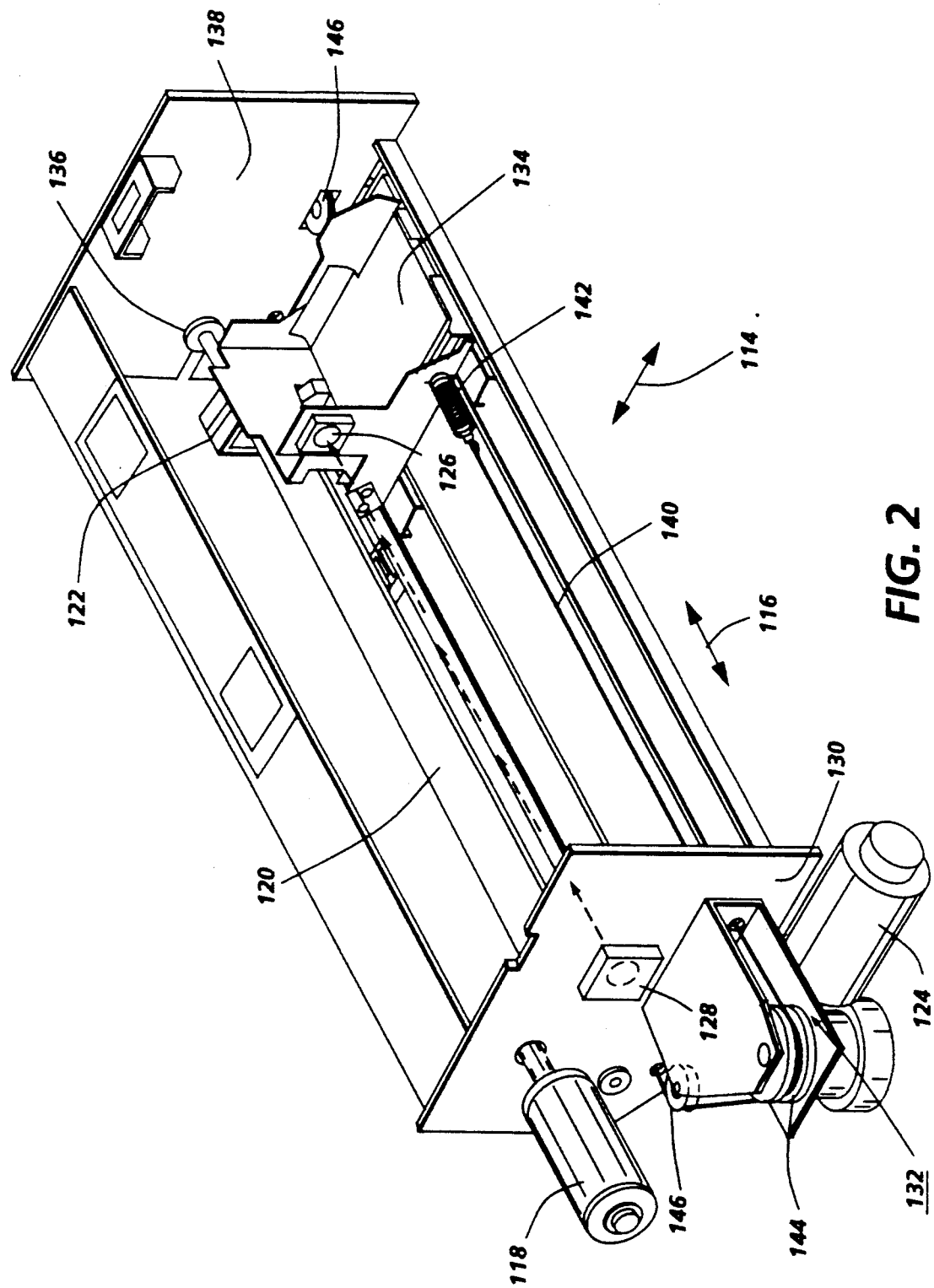
FIG. 2 is a perspective view of the stapler support and positioning apparatus.

As shown in FIG. 2, there are two motors that supply the stapler movement. Control logic signals motor 124 to move stapler 96 front to rear, i.e. in the direction of arrows 116, along the long edge of a set of copy sheets in order to position the stapler at a predetermined location to staple the set of copy sheets. The movement is transmitted to stapler 96 through cable assembly 132. The control logic uses ultrasonic transducers 126 and 128 to track or monitor the location of stapler 96. Transducer 126 detects the ultrasonic wave transmitted by transducer 128, as it moves along the edge of the set of sheets in the direction of arrows 116. As will be hereinafter described, the pair of transducers, 126 and 128, act as a position sensor, to determine the position of stapler 96 relative to front wall 130 of the stapler positioning apparatus. Transducers 126 and 128 may be any commonly know ultrasonic transducers, for example, the MA series of ultrasonic transducers available from Murata Manufacturing Co., Ltd. (e.g., Part No. MA40A5). The staple locations are selectable by adjusting the memory in the control logic and generally depend upon the size of the copy sheet. Motor 118 drives a cam 120 which moves yoke 122 in the direction of arrows 114. Yoke 122 transfers this movement from cam 120 to stapler 96. In this way, cam 96 moves from left to right, i.e. from the operative position to the non-operative position, as indicated by arrows 114. Thus, stapler 96 moves to the left to staple the sheets of the copy set, and to the right in order to back away from the set of copy sheets.

Generally, there are three staple options available, i.e. landscape, portrait and dual staple. In the landscape mode, the staple is placed in the lower left hand corner of the set of copy sheets. In the portrait mode, the staple is placed in the upper left hand corner of the set of copy sheets. In the dual staple mode, two staples are place along the left margin of the set of copy sheets. In the dual staple mode, the staples are spaced apart from one another and in the upper left hand region and lower left hand region, respectively. In portrait stapling, the stapler is left at the home position and is moved from the non-operative position to the operative position after the compiler tray pivots to the stapling position. When compiling of the set of copy sheets is completed, the stapler is actuated placing a staple into the set of copy sheets. The stapler then moves to the non-operative position to enable the compiler tray to pivot down to the position for ejecting the set of copy sheets. For landscape stapling, the stapler moves, while in the non-operative position, along the long edge of the set of copy sheets to the predetermined staple position. This movement is from the front of the printing machine toward the rear of the printing machine. After the set of copy sheets is compiled on the compiler tray, the stapler advances from the non-operative position to the operative position and the stapler is actuated to place a staple in the set of copy sheets. The stapler then moves from the operative position to the non-operative position to enable the compiler tray to pivot to the eject position. In dual stapling, the stapler moves, while in the non-operative position, to the correct predetermined staple position in the rear of the printing machine. After the set of copy sheets is compiled on the compiler tray, the stapler moves from the non-operative position to the operative position and the stapler is actuated placing a staple into the set of copy sheets. While still in the operative position, the stapler moves toward the front of the printing machine to the correct predetermined second staple position and the stapler is actuated placing the second staple into the set of copy sheets. The stapler then moves from the operative position to the non-operative position to allow the compiler tray to pivot to the eject position and the stapler moves to the home position. The foregoing cycle is repeated for multiple sets of copy sheets.

Stapler 96 (not shown) is supported on carriage 134. Carriage 134 is mounted on yoke 122. Cam 120 is mounted in hole 136 in frame 138 and a hole in the rear frame. Cable assembly 132 includes a cable 140 attached to one side of carriage 134 by spring 142. Cable 140 is wrapped around a capstan 144 and routed through a system of pulleys 146 to be attached to the other side of carriage 134. Indexing motor 124 is a reversible DC motor which drives capstan 144. In this way, energizing motor 124 drives capstan 144 which, in turn, moves cable 140 to slide carriage 134 and yoke 122 along cam 120. The direction of movement of carriage 134 is determined by the polarity of the DC voltage exciting motor 124.

Movement of the stapler between the non-operative position and the operative position is accomplished by eccentric cam 120 which spans the complete front to rear length of frame 138. Yoke 122 is mounted slidably on cam 120 and functions as a cam follower moving carriage 134 between the stapler operative and non-operative positions as indicated by arrows 114. Cam 120 is driven in 180° segments by gears (not shown). Motor 118 is a non-reversing DC motor. A timing disc (not shown) is attached to the cam and is configured to interface to a channel sensor (not shown) which provides signal inputs to the control logic to stop the cam in 180° increments. The timing disc also has a flag which interfaces with another channel sensor (not shown) to indicate that the cam and stapler is in the non-operative position.

Figure 3:
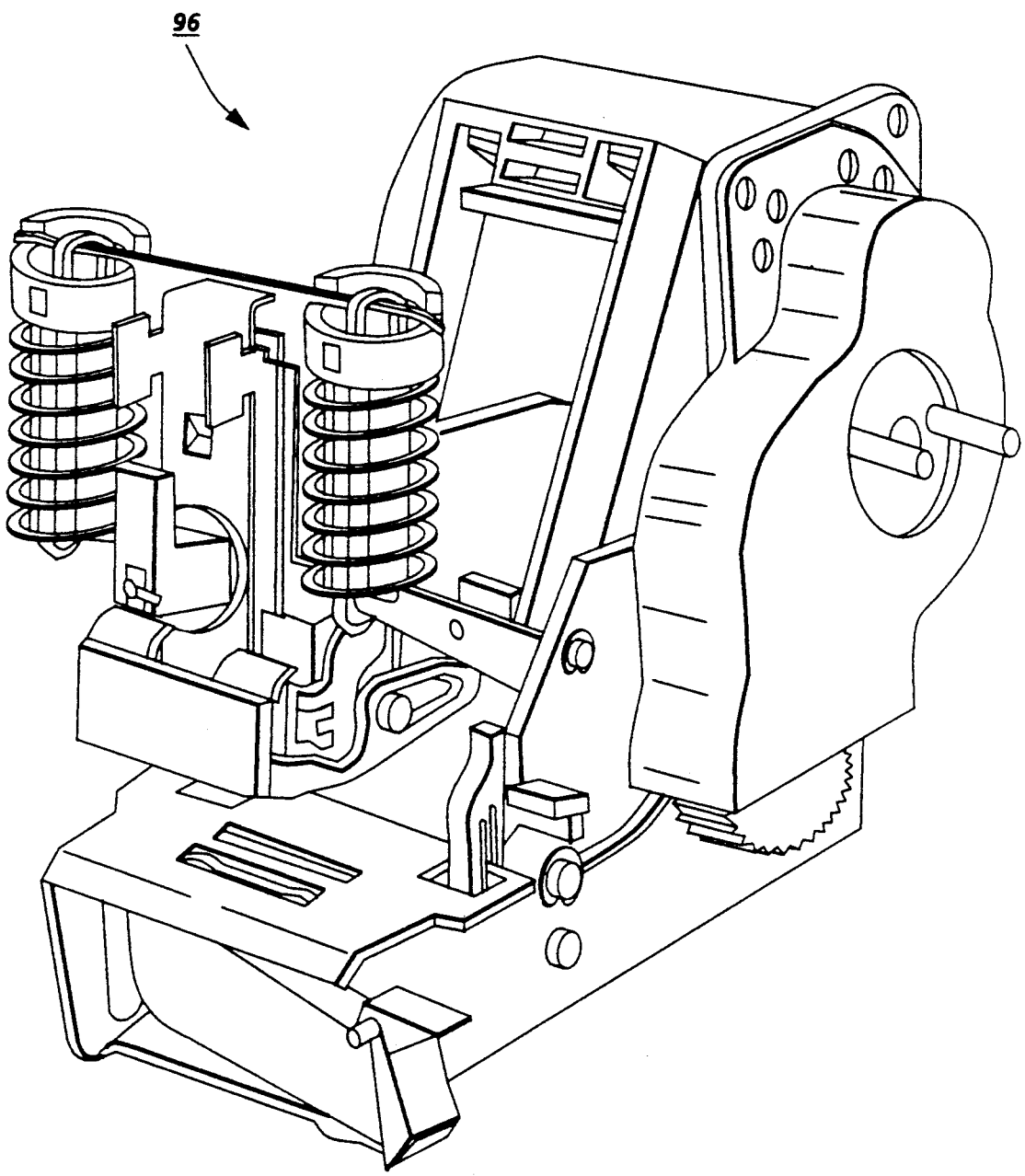
FIG. 3 is a perspective view of the stapler adapted to be mounted in the FIG. 2 stapler support.

FIG. 3 shows stapler 96 which is adapted to be mounted on carriage 134 (FIG. 2). A suitable stapler is manufactured by Max Company, Ltd. of Tokyo, Japan and is described in U.S. Pat. No. 4,623,082 issued Nov. 18, 1986 to Kurosawa, the relevant portions thereof being hereby incorporated into the present application.

Figure 4:
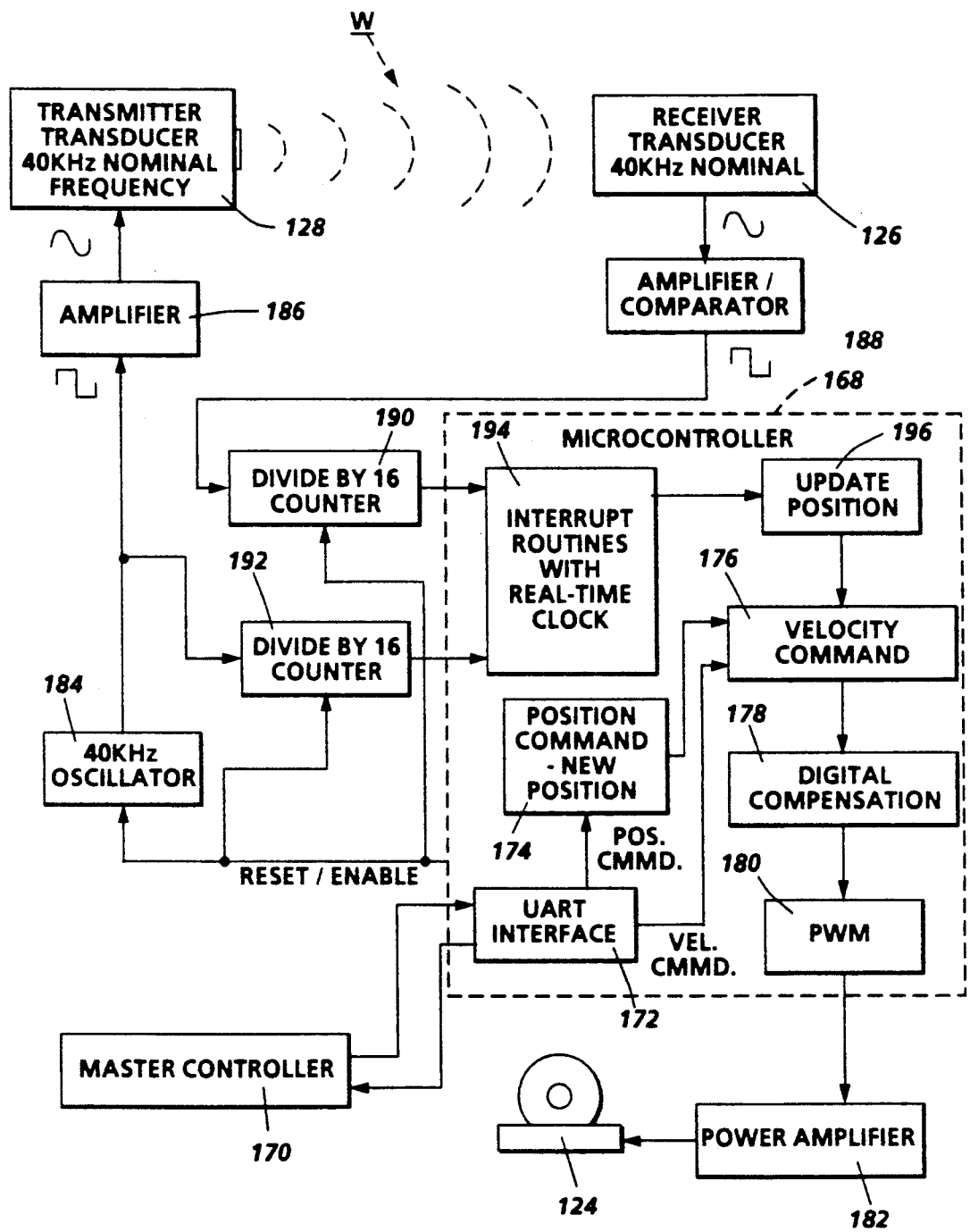
FIG. 4 is a block diagram representing the various electrical circuit components utilized in the present invention.

As shown in FIG. 4, which displays a block diagram of the electrical circuit used to sense the position of carriage 134 in the present embodiment, microcontroller 168 controls, among other functions, the positioning of the stapler for the various stapling options. Microcontroller 168 is preferably an Intel® 8098 microcontroller, having a high-speed, interrupt capability suitable for recording the occurrence of external events based upon a real time clock having a resolution of approximately 2 μsec. Alternatively, an Intel® 80C51FA-2 microcontroller could be used to improve the time resolution to 250 nanoseconds. Microcontroller 168 also includes internal memory (RAM) or registers for storing various position and velocity values for subsequent use in the control of the stapler.

Referring now to FIGS. 4, 5A, 5B, 6A, 6B, and 6C, the operation of the stapler position control will be described in detail. Regulation of the stapling operation begins with the receipt, by microcontroller 168, of a stapler position or velocity command from master controller, 170. The position command directs the movement of the stapler to a specified position with reference to front wall 130 (FIG. 2), and is generated in response to the user selection of a stapling option. The position command is received by the microcontroller via universal asynchronous receiver-transmitter (UART) 172. Once received, the desired position, as represented by the position command, is compared against the actual position of the stapler, new position, as represented by block 174, the difference between the two values representing the amount of linear travel necessary to position the stapler at the desired location. The position change information is passed to a velocity command block, block 176, which also monitors the velocity of stapler carriage 134 (FIG. 2). The velocity command block subsequently takes the incoming position change information or velocity command and calculates a desired velocity. Thereafter, the velocity command block controls the velocity and direction of motor 124 by passing control signals via the internal registers associated with the digital compensation and pulse-width modulation (PWM) blocks, blocks 178 and 180, respectively, that lie within the microcontroller. PWM 180 then produces a pulse-width modulated signal that is amplified by power amplifier 182 to produce an analog control signal which drives motor 124 in a conventional manner.

Figure 5A:
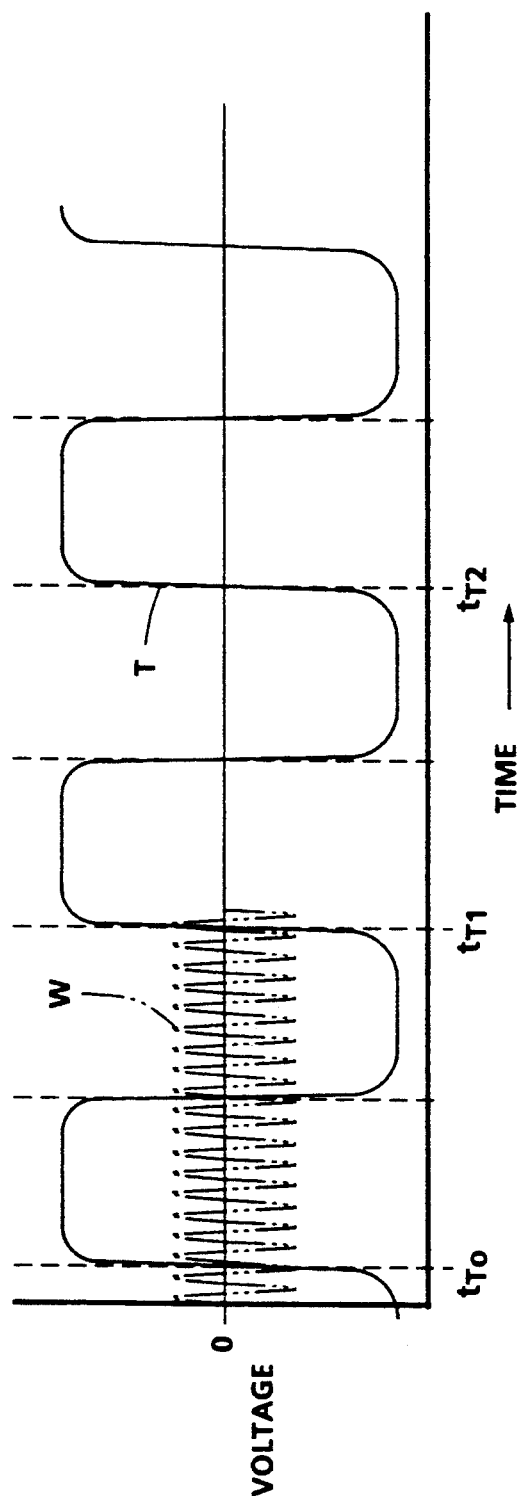
FIGS. 5A and 5B are graphical representations of the signal wave shapes at various points in the electrical circuitry depicted in FIG. 4.
Figure 5B:
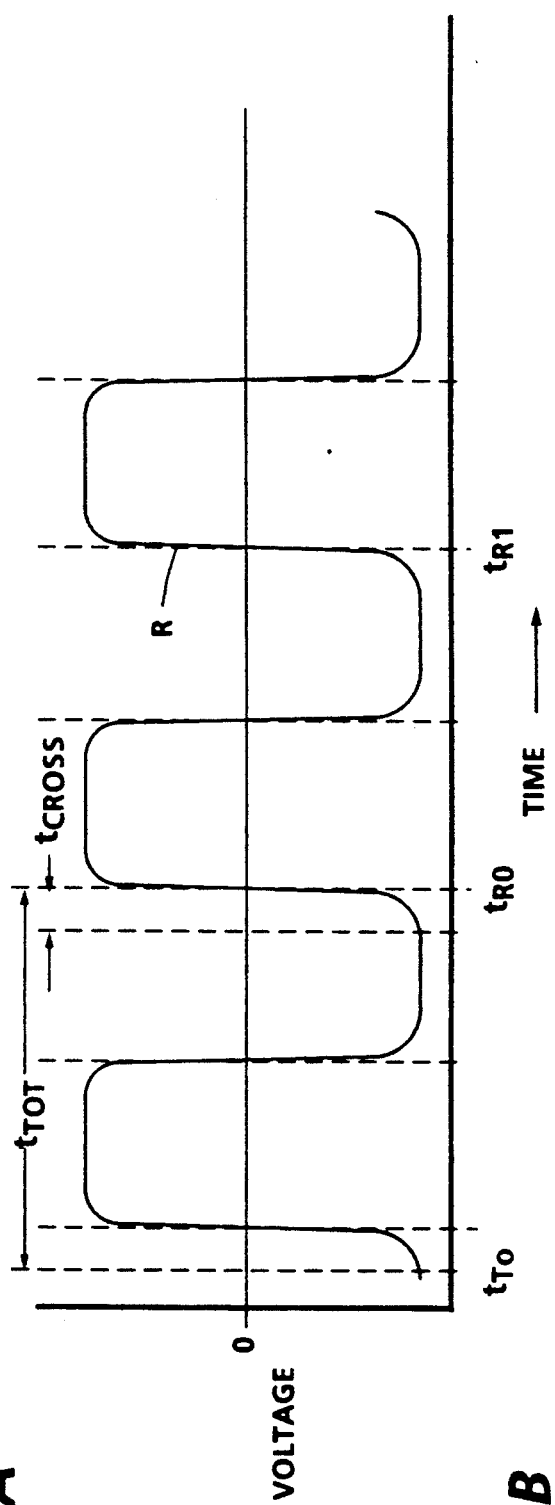

While motor 124 is moving the stapler, microcontroller 168 is continuously monitoring the position, and velocity, of the stapler using the ultrasonic position sensing features of the present invention. More specifically, a 40 kilohertz oscillator, 184, is used, in conjunction with output amplifier 186, to drive transmitting transducer 128 and to thereby produce a 40 KHz ultrasonic wave indicated generally by reference character W (FIG. 5A). At the same time, the transmitter driving signal, from oscillator 184, is also passed to divide-by-sixteen counter 192, where the frequency of the signal is reduced to 2.5 KHz to minimize the impact on the real-time processing bandwidth of the microcontroller. Wave W then propagates from the transmitting transducer, 128, to the receiving transducer 126, where it is received and converted to an analog signal, then amplified by input amplifier/comparator 188. At amplifier/comparator 188 it is also converted to a square wave, or digital logic signal, and then passed to divide-by-sixteen counter, 190, which reduces the frequency of the received signal. The divided transmitter and receiver frequency signals are used to produce a measurable response time for the microcontroller, the resolution of which is limited by the resolution of the fast clock (2 μsec.) which is used. On the other hand, it is possible to implement such a system in a hardware embodiment that does not require the frequency reduction of the present embodiment, due primarily to the real time limitation of the microcontroller.

The outputs of the divide-by-sixteen counters are both fed to the high speed inputs of microcontroller 168, where a low-to-high transition of the counter (e.g., when the counter rolls over) produces an interrupt. Within microcontroller 168, the transmitter and receiver interrupts are handled by the interrupt routines represented by block 194 of FIG. 4. As illustrated in FIG. 6A, the transmitter interrupt is initiated whenever counter 192 transitions from a low to a high voltage (e.g., when the counter reaches coincidence, or rolls over). Subsequently, the time of the transmit interrupt ($t_T$), from the microcontroller's real-time clock, is stored as a time stamp, step 212, and an internally stored counter variable, count, is incremented, step 214, before returning to the interrupted operation, step 216. Similarly, the receiver interrupt, as illustrated in FIG. 6B, is initiated whenever counter 190 transitions from low to high, step 220, signal R of FIG. 5B. Subsequently, the fast clock time, or time stamp, of the receiver interrupt ($t_R$) is stored, step 222, and the counter variable, count, is decremented, step 224, before returning to the interrupted operation, step 226.

During the operation of microcontroller 168, a software interrupt or similar sample triggering event periodically updates the position and velocity of the stapler. As represented by the update position block, block 196 of FIG. 4, and the abridged flowchart of FIG. 6C, the position of the stapler carriage is determined as a function of the difference in the transition times of the divided signals received by the microcontroller. Generally, the difference in transition times is stored in the microcontroller as two components. The first component being the partial cycle time, or the time between the last complete transmitter cycle and the last complete receiver cycle. As illustrated in step 240, the partial cycle elapsed time, $T_{CROSS}$, is determined by subtracting the time at which the most recent transmit transition occurred, $t_T$, from the time at which the most recent receive transition occurred, $t_R$. The second component of the elapsed time is a function of the time required for a complete divide-by-sixteen cycle to occur and the number of complete divide-by-sixteen cycles which have elapsed between the transmitter transition and the receiver transition, as represented by the cycle counter variable, count. As illustrated in step 242, the elapsed cycle time is determined by multiplying the inverse of the divide-by-sixteen frequency ($1 \div 2.5$ KHz) by the counter value, count. Once the two elapsed time components are determined, the total elapsed time $T_{TOT}$ is determined by adding $T_{CROSS}$ and $T_{CYC}$, step 244. Having determined the total elapsed time required for the signal to propagate from the transmitting transducer to the receiving transducer, the distance can be calculated by multiplying the known speed of the acoustic wave, $3.32 \times 10^4$ centimeters/second at standard temperature and pressure, by the the elapsed time.

Alternatively, in order to save microcontroller processing time, the steps directed to calculating the actual distance. Specifically steps 244 and 246, can be simplified or even eliminated. Relying on the calibrated relationship between time and propagation distance for the 2.5 KHz signal (40 KHz divided by 16), as will be hereinafter described, the microcontroller may be programmed to operate solely based on units defined by the resolution of the real-time clock. For example, the position of the movable receiver may be specified and monitored as two component number representing the number of complete or integral 2.5 KHz waves (Count) and the fractional portion of a 2.5 KHz wave ($T_{CROSS}$) in units based upon the real-time clock of the microcontroller. Using such a number avoids the calculations necessary to convert the real-time clock pulses into a fraction, adding it to the count, and converting it into a distance.

To calibrate the stapler position control system, the motor would be driven to a stall position at each end of travel. More specifically, the motor would drive the stapler carriage, in response to a velocity command, toward wall 130 (FIG. 2) where it would run against a mechanical stop. Once the carriage reached the stop, travel would cease, there would be no change detected between two or more successive samples of the carriage position, and the motor would be disabled to prevent damage of the drive mechanisms previously described. The propagation time of the transducer wave would be determined and stored in microcontroller memory or registers. Subsequently, the motor would be driven to the opposite end, toward wall 138 (FIG. 2) and similar operations would be conducted to determine the maximum propagation time for the extreme separation between the two transducers, 126 and 128. Knowing the maximum distance between the two positions, as controlled by the mechanical stops, the microcontroller would be able to calibrate the speed at which the wave propagates, in order to later calculate an actual separation distance between the transducers, or to quantify the relationship between the real-time clock and separation distance. Thus, accounting for variations in the speed of sound due to atmospheric conditions.

As described, the above embodiment only gives rise to an instantaneous position measurement. However, through commonly known sampling techniques, microcontroller 168 may periodically update the position, new position, while storing the previously determined position, old position, and thereby determine an average velocity for the stapler by dividing the change in position by the sample time. Hence, the present invention may also be employed to monitor the speed of the stapler as it traverses from one stapling position to another.

In recapitulation, the present invention is a method and apparatus for monitoring the linear position of a device which is constrained to move in a generally linear direction, for example a copy set stapling mechanism. The present invention is also well suited for determining the average velocity of the device during movement by sampling the position thereof at various times.

It is, therefore, apparent that there has been provided, in accordance with the present invention, a method and apparatus for monitoring the position of a stapling device relative to a set of copy sheets. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad of the appended claims.

I claim:

1. An apparatus for determining the distance between a movable body and a stationary reference location, including:
   an oscillator for generating a first oscillating signal having a fixed frequency;
   first transducer means, permanently affixed at the stationary reference location, for emitting an ultrasonic energy wave in response to said first oscillating signal;

a first frequency divider for reducing the frequency of said first oscillating signal to produce a first reduced frequency signal;

second transducer means, affixed to the movable body, for generating a second oscillating signal having the fixed period, in response to receipt of the ultrasonic energy wave produced by said first transducer means;

a second frequency divider for reducing the frequency of said second oscillating signal to produce a second reduced frequency signal;

synchronizing means, responsive to the first and second reduced frequency signals, for measuring a first elapsed time between the completion of a cycle of the first reduced frequency signal and the completion of a cycle of the second reduced frequency signal, the elapsed time representing a portion of the time required for propagation of the ultrasonic energy wave sent from said first transducer means and received by said second tranducer means;

means, responsive to the first elapsed time and a difference between the number of complete reduced frequency signal cycles produced by said first frequency divider and said second frequency divider, for determining the total elapsed time for propagation of the ultrasonic energy wave between said first transducer and said second transducer; and arithmetic means, coupled to said determining means, for calculating the separation distance between the movable body and the reference location as a function of the total elapsed time.

2. The apparatus of claim 1 wherein:
said first transducer means continuously emits the ultrasonic energy wave; and
said second transducer means continuously receives the ultrasonic energy wave.

3. The apparatus of claim 1, further including means, responsive to said second oscillating signal, for triggering the operation of said synchronizing means.

4. The apparatus of claim 1, further comprising means for scaling the separation distance by a constant corresponding to a speed of sound corrected for atmospheric conditions in which the apparatus is employed.

5. The apparatus of claim 1, wherein said synchronizing means further comprises:
a first detector for signaling the occurrence of a transition by said first reduced frequency signal;
a second detector for signaling the occurrence of a transition by said second reduced frequency signal;
interrupt means, responsive to the signals from said first and second detectors, for continuously storing a first time and a second time at which the respective first and second detector signals are generated; and
a substracter for determining the difference between the first time and the second time, thereby measuring the first elapsed time between the first and second transitions.

6. The apparatus of claim 5, wherein said first and second signal detectors signal the transition of the respective reduced frequency signals whenever said reduced frequency signals are increasing and pass through a reference voltage.

7. The apparatus of claim 1, wherein said determining means comprises:

an up-down counter for continually updating a count representing the difference between the number of complete oscillations of the first reduced frequency signal and the number of complete oscillations of the second reduced frequency signal, said count thereby reflecting the number of outstanding ultrasonic energy wave periods propagating between said first and second transducer means;

a multiplier for multiplying the count by the period of said first reduced frequency signal, to determine a second elapsed time for the propagation of all outstanding ultrasonic energy waves; and an adder for adding the first elapsed time and the second elapsed time to determine a total elapsed time for the propagation of the ultrasonic energy wave.

8. The apparatus of claim 1, wherein said elapsed time determining means represents the elapsed time as a two component value having a first component representing the number of outstanding complete reduced frequency signal cycles, and a second component representing the partial outstanding reduced frequency signal cycle, as determined by said synchronizing means, said second component having units based upon a period of a regularly oscillating clock signal.

9. An apparatus for positioning a stapling device relative to a set of sheets, including:
means for moving the stapling device to a selected stapling position; and
ultrasonic means for sensing the linear position of the stapling device while being moved by said moving means, said ultrasonic means comprising,
first transducer means, permanently affixed at a stationary location, for emitting an ultrasonic signal in response to a first oscillating signal having a selected period,
a first frequency divider for producing a first reduced frequency signal in response to said first oscillating signal,
second transducer means, operatively associated with the stapling device, for continuously generating a second oscillating signal, also having the selected period, in response to receiving the ultrasonic signal produced by said first transducer means,
a second frequency divider for producing a second reduced frequency signal in response to said second oscillating signal, and
means for determining the linear position of the stapling device as a function of the ultrasonic signal propagation time represented by the phase difference between the first and second reduced frequency signals.

10. The apparatus of claim 9, wherein said determining means includes:
synchronizing means, responsive to the first and second reduced frequency signals, for measuring a first elapsed time of a partial-cycle reduced frequency signal sent from said first transducer means and received by said second transducer means;
means, responsive to said synchronizing means and a difference in the number of completed reduced frequency signal cycles sent by said first transducer means and received by said second transducer means, for calculating the total elapsed time for propagation of the ultrasonic signal; and
arithmetic means, coupled to said calculating means, for calculating the linear position of the stapling device as a function of the total elapsed propagation time.

11. A method of monitoring the position of a sheet stapling device with respect to a stationary reference position, in an apparatus having means for transporting the stapling device in a linear direction, substantially parallel to an edge of a set of sheets, comprising the steps of:
   generating a first oscillating signal having a frequency in the ultrasonic range;
   using a first transducer positioned at the stationary reference position to transmit an ultrasonic energy wave in response to the first oscillating signal;
   producing a first reduced frequency signal in response to the first oscillating signal;
   receiving the ultrasonic energy wave with a second transducer, operatively associated with the stapling device;
   producing a second oscillating signal in response said receiving step;
   producing a second reduced frequency signal in response to the second oscillating signal;
   determining the time required for the ultrasonic energy wave to propagate from the first transducer to the second transducer as a function of a time delay between the first and second reduced frequency signals; and
   calculating the position of the stapling device as a function of the ultrasonic energy wave propagation time.

12. The method of claim 11, wherein said determining step includes the steps of:
   continuously recording a first time at which a completed oscillation of the first reduced frequency signal occurs;
   incrementing a counter to indicate the transmission of the complete reduced frequency signal by the first transducer;
   continuously recording a second time at which a complete oscillation of the second reduced frequency signal occurs;
   decrementing the counter to indicate the reception of the complete reduced frequency signal by the second transducer; and
   calculating the propagation time as a function of the first time, the second time, the value of the counter, and the period of a cycle of the first oscillating signal.

13. The method of claim 12, wherein said calculating step includes the steps of:
   approximating a calibrated speed of sound as a function of atmospheric conditions; and
   multiplying the calibrated speed of sound by the propagation time in order to determine the distance separating the first and second transducers.

* * * * *